June 20, 1939.  H. W. KULP  2,162,848
SAWING MACHINE
Filed April 27, 1937  2 Sheets-Sheet 2
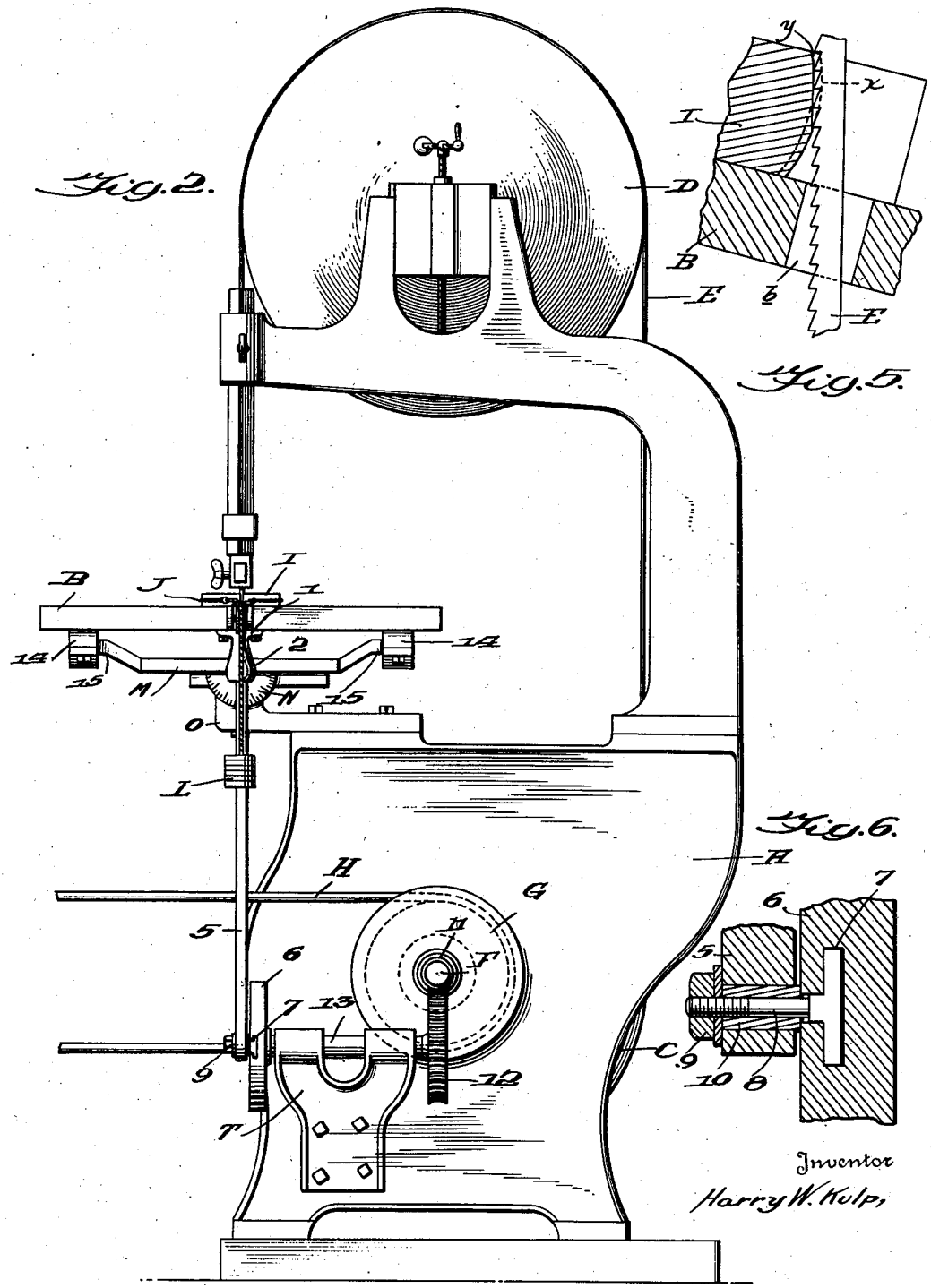
Inventor
Harry W. Kulp,
By Richard E. Babcock
Attorney Patented June 20, 1939

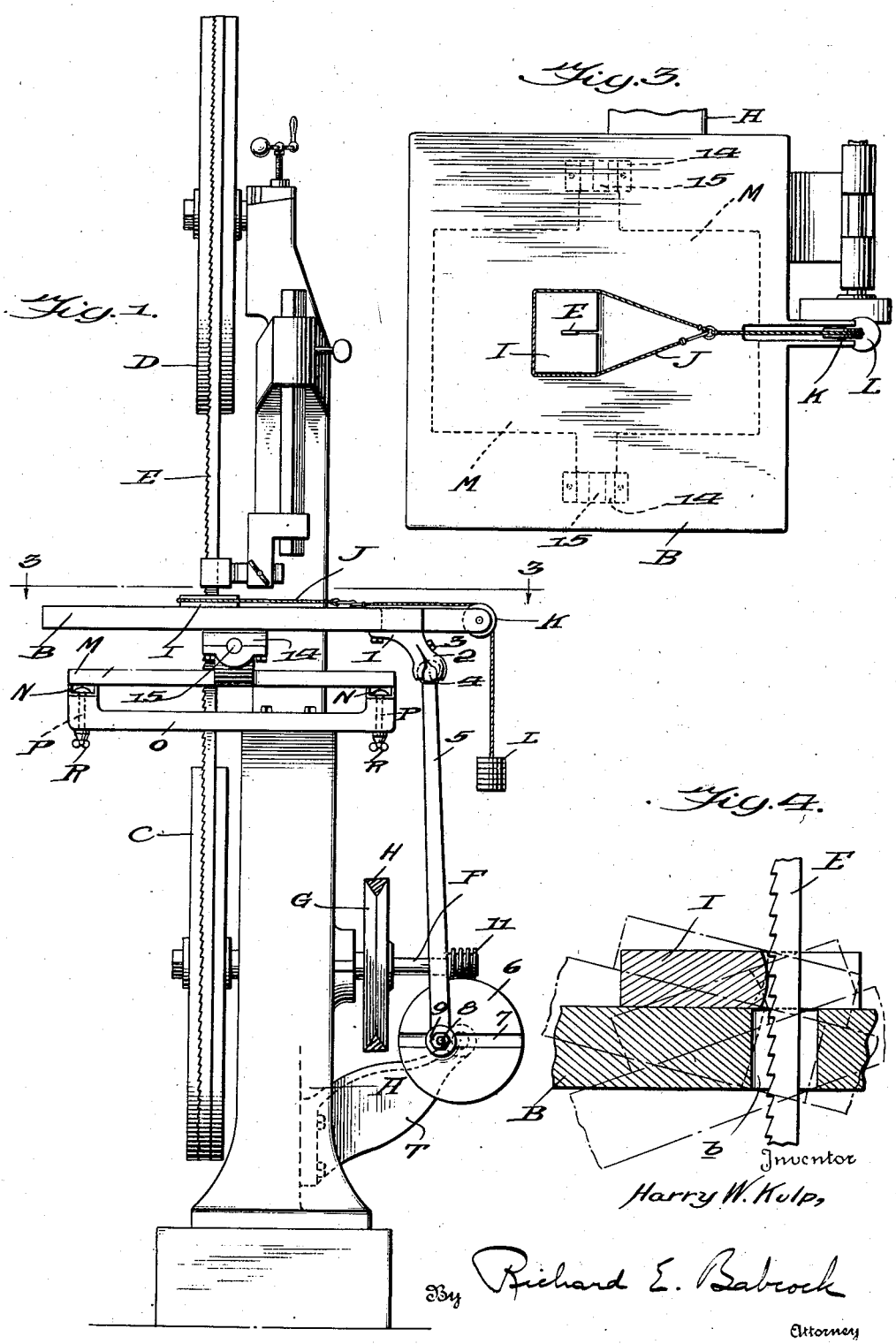

2,162,848

UNITED STATES PATENT OFFICE 2,162,848

SAWING MACHINE

Harry W. Kulp, Lancaster, Pa., assignor to K-D Manufacturing Company, Lancaster, Pa., a corporation of Pennsylvania Application April 27, 1937, Serial No. 139,291

4 Claims. (Cl. 29—68)

This invention relates to a power driven sawing machine and is primarily intended for sawing metal such as iron and steel blocks and bars for various purposes including the production of stamping dies and the like.

The primary objects of the present invention are to provide in such a machine a power driven band saw having a sawing or operative portion or zone all disposed in a straight line and moving at a high speed in combination with a work supporting table presenting the work piece to the operative edge of the saw in said zone and means for continuously oscillating said saw table or work supporting table to continuously and progressively present different portions of the surface of the work to the saw edge, whereby only relatively small areas or thicknesses of the space engaged by the saw edge, in comparison with the total thickness of the block or bar of metal, will be operatively presented to the saw at any one time, the speed of the saw being relatively very fast and the speed of oscillation of the work or saw table being relatively quite slow, whereby the speed of cut of the saw is greatly increased, and to provide for adjusting the angular position of the work table in a direction at right angles to the plane of oscillation while permitting such oscillation in any adjusted position. A further object, considering my invention more narrowly, is to provide in such a combination means driven by the main power element for oscillating said work table. In the accompanying drawings:

Figure 1 represents a front elevation of a metal sawing machine embodying my invention;

Figure 2, a side elevation thereof;

Figure 3, a sectional view on the line 3—3 of Figure 1 looking in the direction of the arrows.

Figure 4, a fragmentary sectional view in the plane of the cut showing the work table or sawing table B and the work piece I in intermediate position in solid lines and in extreme upper and lower oscillated positions in dot and dash lines; and Figure 5, a fragmentary sectional view in the plane of the cut showing the table B and work piece I in their extreme upper oscillated positions and with the saw having cut through a portion of the material of the work piece I on almost a straight line due to the high speed of travel of the saw blade in comparison with the slow rate of oscillation of the table B, defining a slightly curved but almost straight bottom to the kerf of the cut of that portion; and Figure 6, a fragmentary detail sectional view.

Referring now in detail to the drawings, A designates the usual heavy machine frame; B, the work table or sawing table; C, the large driving band saw wheel; D, the large driven band saw wheel; E, the usual endless band saw extending about said wheels; F, the usual drive shaft journalled in a suitable bearing in the frame A and receiving the drive wheel C on one end in vertical alignment with the driven wheel D and receiving the pulley wheel G on its other end; H, the usual drive belt driven by any convenient and usual source of power, not shown; I, the work piece which may be of any size, form and material so long as it may be positioned upon the saw table or work table B and positioned thereon to be operated upon by the operative portion of the band saw E; J, a loop or band extending about the piece of work I and passing over an anti-friction roller or guide K to the rear of the operative face of the saw band E and connected to or carrying a weight L which operates to hold the work piece against the operative face of the band saw E.

The saw table or work supporting table B is provided intermediate its ends with aligned bearings 14 respectively receiving shafts or pintles 15 which extend on opposite sides of a supporting platform M, whereby said saw table B may rock or oscillate about the common axis of the stud shafts or pintles 15. Said table B will of course be formed with a suitable opening b for the passage of the band saw E or one side of the band saw E.

The supporting platform M will preferably be formed of metal and preferably has depending arcuate channeled adjusting and supporting feet N resting on concentric arcuate faces of the respective end portions of the supporting bracket O, the outer or rear face of the rear foot N being provided with a plurality of graduation markings as shown in Figure 2 to be brought into registry with an index mark (not shown) on the adjacent rear face of the end of the corresponding rear end portion of the bracket O.

Each foot N has its lower face slotted for its full length or substantially its full length to receive the clamping bolt P which extends through a corresponding bore in its corresponding end portion of the bracket O and receives an adjusting wing nut R on its lower end. The head of each bolt P spans the slot in its corresponding cooperating foot N and its nut R on being screwed up engages the lower face of the corresponding end portion of the bracket O and draws the head of the bolt down to clamp the bottom portion of its corresponding foot N between the head of said bolt P and the supporting arcuate face of the corresponding end portion of the bracket O in any position of angular adjustment to which the supporting platform M may be moved.

In the embodiment of the invention illustrated a connecting member 1 is connected in any suitable manner as by bolts or welding to the work supporting table B and is formed with a ball socket portion 2 having the center or axis of its socket in alignment with the common axes of the arcuate lower faces of the feet N. This ball socket 2 may be of the split type of construction illustrated, a clamping screw or bolt 3 serving to close the socket about the ball 4 on the pitman 5, the removing or reverse operation of the screw or bolt 3 allowing the socket 2 to spread to permit the ball 4 to be removed from, or inserted into, the socket 2.

A counter-shaft 13 mounted in suitable bearings of a bracket T secured to the main frame A has a slotted disc wheel 6 mounted on one end and a gear pinion 12 mounted on its other end portion.

The disc wheel 6 is formed with a throw adjusting slot 7 of any suitable or preferred cross-sectional dove-tail form.

The pitman 5 has its lower end adjustably connected to said disc wheel 6 by means of a wrist pin 8 extending through an eye or opening in the lower end portion of said pitman 5 and having a wide head preferably corresponding in cross-section to the cross-section of the slot 7 and having the end portion of its stem screw threaded to receive the clamping nut 9. In practice the head of the wrist pin 8 is inserted in the slot 7, a spacing sleeve 10 is slipped over the free end of the wrist pin 8 and into engagement with the face of the disc-wheel 6, the eye of the pitman 5 is then slipped over the free end of the sleeve 10, a washer may then be slipped over the end of the wrist pin 8, the wrist pin 8 is then moved lengthwise of the slot 7 to the point necessary to obtain the desired throw or stroke of oscillatory movement and finally the nut 9 is tightened up, engaging the adjacent end of the sleeve 10 and forcing its distant end against the face of the disc-wheel 6 and drawing the head of the wrist pin 8 into clamping engagement with the opposed face of the dove-tail slot 7, thus firmly locking the wrist pin 8 in adjusted position.

A worm gear 11 is mounted on main drive shaft F and meshes with gear pinion 12.

Under normal operative conditions the band saw blade will be travelling at a high rate of speed, probably somewhere around three hundred linear feet per minute whereas in contrast the saw table or work supporting table will only make from four to eight complete oscillations per minute, according to the preference of the operator and the particular hook-up of the particular machine.

Assuming a complete cut has been made entirely through the work piece, leaving the bottom face of the kerf arcuate in cross section as illustrated in Figure 4 and that the table and work have oscillated to the position illustrated in Figure 5 and the initial stage of the next complete cut has been started, as illustrated in said Figure 5, it will be seen that the band saw blade is presented at a tangent to the arcuate face of the bottom of the kerf and serves to cut into the metal on a straight tangential line as modified by the much slower arcuate movement of the work and table themselves, resulting in a short arcuate cut on the arc of a circle having as its axis the axis of the trunnions or shafts 15 and crossing and intersecting the previous arcuate face defined by the previous complete through cut of the work, thus presenting a relatively small body of metal at any one time to the saw blade with resultant increase in the speed of cutting of the work by the saw.

By actual test and comparison over a period of some months I have found that the same sawing machine operating under identical conditions of power and spaced in the travel of the saw and operating upon the same nature of metal work piece having exactly the same characteristics will cut the metal at least fifty per cent faster when the work table is oscillated in accordance with my invention than it will when the work table or saw table B is not oscillated, the loop J being employed with the same weight L connected to its lower end to pull the work piece I against the saw E being used in each instance.

Of course the loop or strap J with its weight L for forcing the work piece I against the cutting edge of the saw may be employed or omitted, according to the particular job in process and the preferences of the particular operative, who may prefer simply to hold the work with his hand against the saw, and of course where the strap J with its weight L is used the size and poundage of the weight may vary according to the preference of the particular operative, the cutting qualities and speed of travel of the saw and the character of the particular job and the material of the particular work piece I.

Of course the gearing or means for driving the countershaft 13 may be substituted by any other suitable driving means or may be independently driven. Also it is to be understood that any known means suitable to the purpose may be employed to oscillate the table B in substitution for the means illustrated, and said means may be driven by hydraulically, pneumatically, electrically or by any available medium or method.

I claim:

1. A band saw machine frame, an endless band saw, means journalled in said frame for driving said band saw, an adjustable platform mounted on said frame, means for selectively holding said platform in a horizontal and various inclined adjusted positions about a central axis, a work supporting table, means for rockably mounting said table on said platform for oscillatory movement about an axis extending at right angles to the blade of said band saw, in combination with a socket member rigid with and extending from said table, a counter-shaft, a pitman connected to and driven by said counter-shaft, means for adjusting the throw of said pitman, driving connections between said saw driving means and said counter-shaft for driving the latter and a ball carried by said pitman and received in said socket to constitute a ball and socket drive connection, the center of said ball and socket joint lying substantially in a plane intersecting said central axis and extending substantially parallel to and substantially coincident with the operative portion of the band saw.

2. A band saw machine frame, an endless band saw, means journalled in said frame for driving said band saw, an adjustable platform mounted on said frame, means for selectively holding said platform in a horizontal and various inclined adjusted positions about a central axis, a work supporting table, means for rockably mounting said table on said platform for oscillatory movement about an axis extending at right angles to the operative portion of the band saw, in combination with driven means connected to said work supporting table to cause the oscillation thereof in any position of adjustment of said platform and means for varying the degree of oscillation of said work supporting table.

3. A band saw machine frame, an endless band saw, means journalled in said frame for driving said band saw at a high speed, a platform, adjustable means for mounting said platform on said frame, means for adjusting said platform in a horizontal and various inclined positions about a central axis, a work supporting table, trunnions rigid with said platform and having a common axis extending at right angles to said central axis, and bearings connected with said table and respectively receiving said trunnions, in combination with means connected to said table for oscillating the latter about the common axis of said trunnions with a slow oscillatory movement in any position of adjustment of said platform and means for regulating the extent of the stroke of said oscillatory movement.

4. A band saw machine frame, an endless band saw, means journalled in said frame for guiding said band saw, means for driving said band saw, a work supporting table, connections between said frame and table for mounting the table in relation to said frame for oscillatory movement about an axis extending approximately at right angles to the operative portion of the band saw, in combination with adjustable driven means connected to said work supporting table to oscillate the latter and means for regulating the extent of the stroke of said driven means.

HARRY W. KULP.